United States Patent
Lee et al.

(10) Patent No.: US 10,910,626 B2
(45) Date of Patent: Feb. 2, 2021

(54) SECONDARY BATTERY INCLUDING BOTTOM RETAINER

(71) Applicant: SAMSUNG SDI CO., LTD., Yongin-si (KR)

(72) Inventors: Won-Jun Lee, Yongin-si (KR); Sang-Won Byun, Yongin-si (KR); Hong-Hyeon Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 43 days.

(21) Appl. No.: 14/662,490

(22) Filed: Mar. 19, 2015

(65) Prior Publication Data
US 2015/0280202 A1 Oct. 1, 2015

(30) Foreign Application Priority Data

Mar. 28, 2014 (KR) .................. 10-2014-0036787

(51) Int. Cl.
*H01M 2/34* (2006.01)
*H01M 2/02* (2006.01)
(Continued)

(52) U.S. Cl.
CPC ........... *H01M 2/34* (2013.01); *H01M 2/0237* (2013.01); *H01M 2/14* (2013.01); *H01M 2/18* (2013.01);
(Continued)

(58) Field of Classification Search
None
See application file for complete search history.

(56) References Cited

U.S. PATENT DOCUMENTS 3,907,193 A * 9/1975 Heller ................... B29C 53/063
229/930
5,972,534 A * 10/1999 Pasquier ................. H01M 2/00
429/142
(Continued)

FOREIGN PATENT DOCUMENTS

CN 102208594 A 10/2011
CN 103258983 A 8/2013
(Continued)

OTHER PUBLICATIONS

Furubayashi et al., Machine Translation of JP 2004-253330 (Year: 2004).*
(Continued)

*Primary Examiner* — Ula C Ruddock
*Assistant Examiner* — Anna Korovina
(74) *Attorney, Agent, or Firm* — Lee IP Law, P.C.

(57) ABSTRACT

A secondary battery, including an electrode assembly including a first electrode, a second electrode, and a separator between the first and second electrodes; a first lead tab electrically connected to the first electrode; a second lead tab electrically connected to the second electrode; a case accommodating the electrode assembly, the first lead tab, and the second lead tab therein, with an opening in a top of the case; a cap plate closing the opening of the case; and a bottom retainer on a bottom interior of the case, the bottom interior facing the top of the case, the bottom retainer including a non-contact region not in contact with the bottom interior of the case.

7 Claims, 4 Drawing Sheets

(51) Int. Cl.
  *H01M 10/04* (2006.01)
  *H01M 2/18* (2006.01)
  *H01M 2/14* (2006.01)
  *H01M 2/26* (2006.01)
(52) U.S. Cl.
  CPC ............ *H01M 2/26* (2013.01); *H01M 2/345* (2013.01); *H01M 2/348* (2013.01); *H01M 10/0413* (2013.01); *H01M 2/266* (2013.01); *H01M 2200/00* (2013.01); *H01M 2200/10* (2013.01); *H01M 2200/103* (2013.01); *H01M 2200/20* (2013.01); *H01M 2220/20* (2013.01)

(56) References Cited

U.S. PATENT DOCUMENTS

| | | | |
|---|---|---|---|
| 6,083,640 | A * | 7/2000 | Lee ............ H01M 2/0277 429/161 |
| 8,709,632 | B2 | 4/2014 | Kim et al. |
| 8,889,292 | B2 | 11/2014 | Kim et al. |
| 9,059,459 | B2 | 6/2015 | Byun et al. |
| 9,159,984 | B2 | 10/2015 | Guen |
| 9,214,652 | B2 | 12/2015 | Tsuruta et al. |
| 2006/0024568 | A1 | 2/2006 | Lee |
| 2006/0246346 | A1 * | 11/2006 | Kishiyama ............ H01M 4/661 429/72 |
| 2011/0052975 | A1 * | 3/2011 | Lee ............ H01M 2/0237 429/178 |
| 2011/0081573 | A1 | 4/2011 | Kim et al. |
| 2011/0117402 | A1 | 5/2011 | Kim et al. |
| 2011/0189536 | A1 * | 8/2011 | Moon ............ H01M 2/0275 429/185 |
| 2011/0244280 | A1 * | 10/2011 | Byun ............ H01M 2/0404 429/61 |
| 2012/0052341 | A1 | 3/2012 | Kim et al. |
| 2012/0088146 | A1 * | 4/2012 | Byun ............ H01M 10/02 429/163 |
| 2012/0214050 | A1 * | 8/2012 | Kim ............ H01M 2/263 429/179 |
| 2012/0282515 | A1 | 11/2012 | Kim |
| 2013/0101870 | A1 | 4/2013 | Byun et al. |
| 2013/0209859 | A1 * | 8/2013 | Tsuruta ............ H01G 9/06 429/142 |
| 2013/0252053 | A1 * | 9/2013 | Woo ............ H01M 10/0431 429/94 |

FOREIGN PATENT DOCUMENTS

| | | |
|---|---|---|
| EP | 2 309 569 A1 | 4/2011 |
| EP | 2 328 204 A1 | 6/2011 |
| EP | 2 426 752 A2 | 3/2012 |
| EP | 2 587 567 A1 | 5/2013 |
| JP | 2004253330 A * | 9/2004 |
| JP | 2011-108644 A | 6/2011 |
| JP | 2011-210717 A | 10/2011 |
| JP | 2012-248462 A | 12/2012 |
| JP | 2013-89592 A | 5/2013 |
| JP | 2013-115042 A | 6/2013 |
| JP | 2013-191544 A | 9/2013 |
| KR | 10-2007-0108752 A | 11/2007 |
| KR | 10-2012-0123945 A | 11/2012 |

OTHER PUBLICATIONS

Extended European Search Report dated Jul. 3, 2015 in Corresponding European Patent Application No. 15161112.6.
Examination report issued by the European Patent Office dated Jan. 24, 2017 in the examination of the European Patent Application No. 15 161 112.6.
Chinese Office Action issued by the Chinese Patent Office dated Apr. 27, 2018 in the examination of the Chinese Patent Application No. 201510133985.X.
Extended European search report issued by the European Patent Office dated Aug. 7, 2018 in the examination of the European Patent Application No. 15161112.6.
Office Action issued by the Chinese Patent Office dated Apr. 29, 2019 in the examination of the Chinese Patent Application No. 201510133985.X.
Office Action dated Dec. 11, 2018 corresponding to Japanese Patent Application No. 2015-057501.
Office Action dated Jan. 8, 2019 corresponding to Chinese Patent Application No. 201510133985.X.
Office Action issued by the Chinese Patent Office dated Aug. 14, 2019 in the examination of the Chinese Patent Application No. 201510133985.X.
Chinese Reexamination issued Jun. 1, 2020.

* cited by examiner

SECONDARY BATTERY INCLUDING BOTTOM RETAINER

CROSS-REFERENCE TO RELATED APPLICATION

Korean Patent Application No. 10-2014-0036787, filed on Mar. 28, 2014, in the Korean Intellectual Property Office, and entitled: "Secondary Battery," is incorporated by reference herein in its entirety.

BACKGROUND

1. Field

Provided is a secondary battery.

2. Description of the Related Art

A secondary battery is a battery that may be repeatedly charged or discharged, unlike a primary battery. A low-capacity secondary battery may be used for a portable and small electronic device, such as a mobile phone, a notebook computer or a camcorder, whereas a high-capacity secondary battery may be used as a power source for driving a motor of a hybrid vehicle or the like.

SUMMARY

Embodiments may be realized by providing a secondary battery, including an electrode assembly including a first electrode, a second electrode, and a separator between the first and second electrodes; a first lead tab electrically connected to the first electrode; a second lead tab electrically connected to the second electrode; a case accommodating the electrode assembly, the first lead tab, and the second lead tab therein, with an opening in a top of the case; a cap plate closing the opening of the case; and a bottom retainer on a bottom interior of the case, the bottom interior facing the top of the case, the bottom retainer including a non-contact region not in contact with the bottom interior of the case.

The bottom retainer may include a body portion; and the non-contact region adjacent the body portion in a longitudinal direction thereof.

The non-contact region of the bottom retainer may include grooves on opposite sides of a middle region of the body portion in the longitudinal direction thereof.

The non-contact region of the bottom retainer may include first and second pairs of grooves spaced apart from each other in the longitudinal direction, each of the pairs of grooves being on opposite sides of a middle region of the body portion in the longitudinal direction thereof.

The first electrode may include a cathode, and the second electrode includes an anode.

The first or second lead tab may include a fuse portion, and a position of the bottom retainer on the bottom interior of the case may correspond to the fuse portion.

The fuse portion may be around the anode.

The bottom retainer may include an insulation member.

The secondary battery may further include electrolyte between the bottom retainer and the bottom interior of the case.

Embodiments may be realized by providing a secondary battery, including an electrode assembly including a first electrode, a second electrode, and a separator between the first and second electrodes; a first lead tab electrically connected to the first electrode; a second lead tab electrically connected to the second electrode; a case accommodating the electrode assembly, the first lead tab, and the second lead tab therein, with an opening in a top of the case; a cap plate closing the opening of the case; and a bottom retainer on and not completely covering a bottom interior of the case, the bottom interior facing the top of the case.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
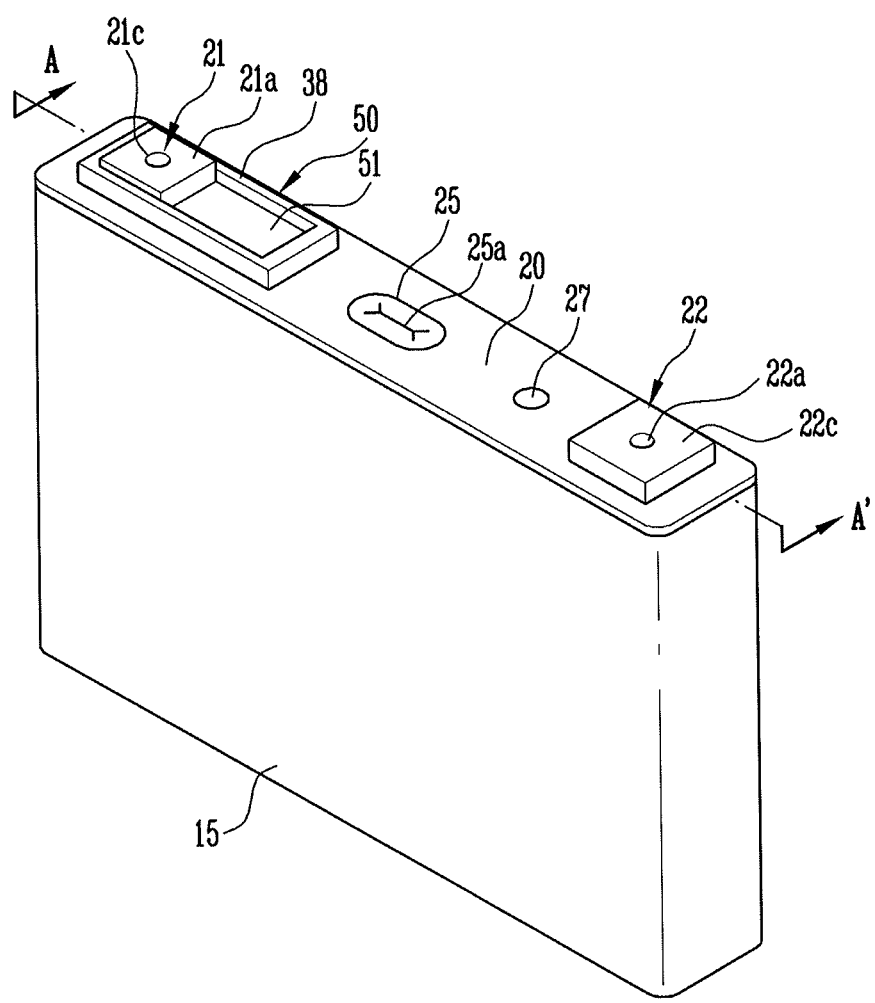
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will also be understood that when an element is referred to as being "on" another element, it can be directly on the other element, or intervening elements may also be present. In addition, it will also be understood that when an element is referred to as being "between" two r elements, it can be the only element between the two elements, or one or more intervening elements may also be present.

In the following description, like reference numerals are used to identify like elements throughout different drawings. For clarity and convenience of description, the size or shape of elements shown in the drawings may not be illustrated to scale.

Figure 2:
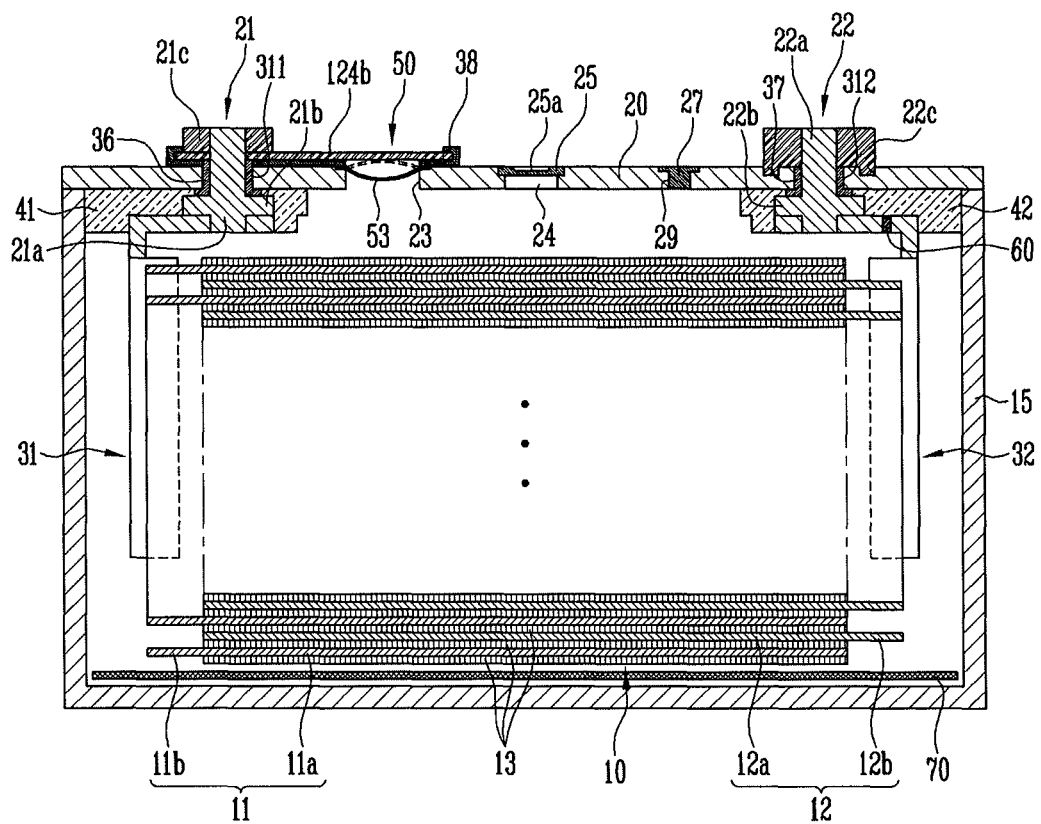
FIG. 2 illustrates a sectional view taken along line A-A' of FIG. 1.
Figure 3:
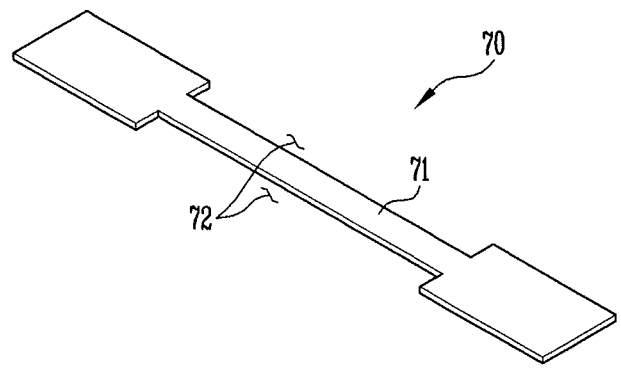
FIG. 3 illustrates a perspective view of a bottom retainer according to an embodiment.

FIG. 1 illustrates a perspective view of a secondary battery according to an embodiment, and FIG. 2 illustrates a sectional view taken along line A-A' of FIG. 1. FIG. 3 illustrates a perspective view of a bottom retainer according to an embodiment. Referring to FIGS. 1, 2 and 3, the secondary battery according to an embodiment may include an electrode assembly 10, a first lead tab 31, a second lead tab 32, a case 15 which accommodates the electrode assembly 10, the first lead tab 31, and the second lead tab 32 and has an opening on a top thereof, and a cap plate 20 which closes the opening of the case 15. The secondary battery may include a first electrode terminal 21 (hereinafter referred to as a "cathode terminal") and a second electrode terminal 22 (hereinafter referred to as an "anode terminal") which are provided on the cap plate 20, an external short-circuit portion 50 which is provided around the cathode terminal 21, and a fuse portion 60 which is provided around the anode terminal 22.

A bottom retainer 70 may be provided on a bottom interior of the case 15, the bottom interior facing the top of the case. The bottom retainer 70 may be provided with non-contact regions 72 that are not in contact with the bottom interior of the case 15.

The bottom retainer 70 may include a body portion 71, e.g., a plate-shaped body portion 71. Each non-contact region 72 may be formed on, e.g., eliminated or removed from, a region in a longitudinal direction of the body portion 71. For example, the non-contact region 72 of the bottom retainer 70 may have the shape of a groove that may be formed by eliminating, e.g., removing, each of opposite sides of a middle region of the body portion 71 in the longitudinal direction thereof, e.g., the bottom retainer 70 may not completely cover the bottom interior of the case 15.

The electrode assembly 10 according to an embodiment intended to charge or discharge an electric current may include a separator 13 that is an insulator, and a first electrode 11 (hereinafter referred to as a "cathode"), and a second electrode 12 (hereinafter referred to as an "anode") provided on opposite sides of the separator 13. The electrode assembly 10 may be formed by placing the first and second electrodes 11 and 12 on the opposite sides of the separator 13 and then winding the cathode 11, the separator 13 and the anode 12 in a jelly-roll form. Each of the cathode 11 and the anode 12 may include a coating portion 11a, 12a and a non-coating portion 11b, 12b. The coating portion may be formed by applying an active material to a current collector of a metal plate. The non-coating portion may be an exposed portion of the current collector because no active material is applied thereto.

The non-coating portion 11b of the cathode 11 may be formed on one end of the cathode 11 along the wound cathode 11. The non-coating portion 12b of the anode 12 may be formed on one end of the anode 12 along the wound anode 12. The non-coating portions 11b and 12b may be disposed on opposite ends of the electrode assembly 10, respectively.

For example, the case 15 may have the shape of a rectangular parallelepiped to define a space for accommodating the electrode assembly 10 and an electrolyte therein. An opening connecting an outside with an internal space of the battery may be formed in a surface of the rectangular parallelepiped. The opening may allow the electrode assembly 10 to be inserted into the case 15.

The cap plate 20 may be made of a thin steel sheet and then mounted to the opening of the case 15, thus closing the case 15. The cap plate 20 may further include an electrolyte inlet port 29 and a vent hole 24. After the cap plate 20 is coupled to the case 15, the electrolyte inlet port 29 may allow the electrolyte to be injected into the case 15. After the electrolyte has been injected, the electrolyte inlet port 29 may be sealed by a sealing stopper 27.

The vent hole 24 for discharging an internal pressure of the secondary battery may be closed by a vent plate 25. If the internal pressure of the secondary battery reaches a preset level, the vent plate 25 may be cut, and the vent hole 24 may be opened. The vent plate 25 may have a notch 25a to induce cutting.

The cathode terminal 21 and the anode terminal 22 may be installed to pass through the cap plate 20 and may be electrically connected to the electrode assembly 10. For example, the cathode terminal 21 may be electrically connected to the cathode 11 of the electrode assembly 10, while the anode terminal 22 may be electrically connected to the anode 12 of the electrode assembly 10, and polarities of the electrode assembly 10 may be revealed to the outside of the case 15, via the cathode terminal 21 and the anode terminal 22.

The cathode terminal 21 and the anode terminal 22 inside the cap plate 20 may have the same structure, and only one of the cathode and anode terminals 21 and 22 will be described. The cathode terminal 21 and the anode terminal 22 outside the cap plate 20 may have different structures, and the cathode and anode terminals 21 and 22 will be separately described.

The cathode, anode terminal 21, 22 may include a rivet terminal 21a, 22a, a flange 21b, 22b, and a terminal plate 21c, 22c. The rivet terminal 21a, 22a may be installed in the terminal hole 311, 312 of the cap plate 20. The flange 21b, 22b may be integrally provided inside the cap plate 20, and may extend widely in such a way as to be integrated with the rivet terminal 21a, 22a. The terminal plate 21c, 22c may be disposed outside the cap plate 20 to be connected to the rivet terminal 21a, 22a by riveting or welding.

A cathode, anode gasket 36, 37 may be provided between the rivet terminal 21a, 22a of the cathode, anode terminal 21, 22 and an inner surface of the terminal hole 311, 312 of the cap plate 20, and a gap between the rivet terminal 21a, 22a of the cathode, anode terminal 21, 22 and the cap plate 20 may be sealed. The cathode, anode gasket 36, 37 may extend further between the flange 21b, 22b and the inner surface of the cap plate 20, and a gap between the flange 21b, 22b and the cap plate 20 may be further sealed. For example, the cathode, anode gasket 36, 37 may be provided around the cathode, anode terminal 21, 22 on the cap plate 20, and the electrolyte may be prevented from leaking out through the terminal hole 311, 312.

A plurality of electrode assemblies 10 may be provided (see FIG. 2), and respective cathodes 11 of the electrode assemblies 10 may be electrically connected to each other via the cathode lead tab 31, and anodes 12 thereof may be electrically connected to each other via the anode lead tab 32. In an embodiment, the secondary battery may have one electrode assembly.

The cathode, anode lead tab 31, 32 may electrically connect the cathode, anode terminal 21, 22 to the cathode, anode 11, 12 of the electrode assembly 10. For example, the cathode, anode lead tab 31, 32 may be coupled to a lower end of the rivet terminal 21a, 22a, and caulking may be performed on the lower end, and the cathode, anode lead tab 31, 32 may be connected to the lower end of the rivet terminal 21a, 22a while being supported by the flange 21b, 22b.

A cathode, anode insulation member 41, 42 may be provided between the cathode, anode lead tab 31, 32 and the cap plate 20, and the cathode, anode lead tab 31, 32 may be electrically insulated from the cap plate 20. The cathode, anode insulation member 41, 42 may be coupled at one side thereof to the cap plate 20, and may surround at the other side thereof the cathode, anode lead tab 31, 32, the rivet terminal 21a, 22a and the flange 21b, 22b, and a connecting structure may be stabilized.

The external short-circuit portion 50 pertaining to the terminal plate 21c will be described. Referring to FIG. 2, the external short-circuit portion 50 may include a short-circuit tab 51 and a short-circuit member 53 which may be spaced apart from each other or cause a short circuit depending on an internal pressure.

The short-circuit tab 51 may be electrically connected to the rivet terminal 21a of the cathode terminal 21, and may be disposed outside the cap plate 20 with the insulation member 38 interposed between the short-circuit tab 51 and the cap plate 20. The insulation member 38 may be provided between the short-circuit tab 51 and the cap plate 20, and the short-circuit tab 51 may be electrically insulated from the cap plate 20. For example, the cap plate 20 may be electrically insulated from the cathode terminal 21.

The short-circuit tab 51 and the terminal plate 21c may be placed on an upper end of the rivet terminal 21a and caulking may be performed on the upper end. The short-circuit tab 51 and the terminal plate 21c may be coupled to the upper end of the rivet terminal 21a, and the short-circuit tab 51 and the terminal plate 21c may be secured and supported on the cap plate 20 with the insulation member 38 interposed between the short-circuit tab 51, the terminal plate 21c and the cap plate 20.

The short-circuit member 53 may be installed in a short-circuit hole 23 of the cap plate 20. The short-circuit tab 51 may be connected to the cathode terminal 21 and may then extend towards the short-circuit member 53. The short-circuit tab 51 and the short-circuit member 53 may face each other in the short-circuit hole 23, and a spaced state (see a solid line) or a short-circuit state (see an imaginary line) may be created.

When the internal pressure of the secondary battery rises, the short-circuit member 53 may be deformed from the state shown by the solid line of FIG. 2 to the state shown by the imaginary line, and contact may be made with the short-circuit tab 51. The short-circuit tab 51 may be electrically connected to the cap plate 20, and a short-circuit state of the electrode assembly 10 may be maintained. In the event of a short circuit, a high-voltage current may be instantaneously discharged between the cathode and anode terminals 21 and 22 through the short-circuit tab 51 and the short-circuit member 53. The fuse portion 60 may be melted and cut on the discharge line connecting the electrode assembly 10 with the cathode, anode terminal 21, 22.

When the fuse portion 60 is melted and cut, arc may be produced at the cut point. The arc debris may drop to the bottom interior of the case, and the bottom interior of the case may be melted and damaged. A bottom retainer, formed to have the same shape as the bottom interior of the case and provided on the bottom interior of the case, may prevent electrolyte collected between the bottom interior of the case and the bottom retainer during the injection of the electrolyte when the secondary battery is assembled from being absorbed by the electrode assembly.

The secondary battery according to an embodiment may eliminate the opposite sides of the middle region of the bottom retainer 70 in the longitudinal direction thereof, e.g., non-contact regions 72 may be removed from opposite sides of the bottom retainer 70 in the longitudinal direction thereof, and electrolyte collected in the bottom interior of the case 15 may be allowed to flow smoothly, e.g., electrolyte may not be prevented from being absorbed by the electrode assembly. For example, the bottom retainer 70 may include a plate-shaped body portion 71 and groove-shaped non-contact regions 72 formed by eliminating, e.g., removing, the opposite sides of the middle region of the body portion 71 in the longitudinal direction thereof.

The non-contact regions 72 may be formed on, e.g., eliminated or removed from, regions of the bottom retainer 70 other than a region where the arc debris caused by the arc produced in the fuse portion 60 may be dropped and thereby the case 15 may be melted. This will be described in detail with reference to FIGS. 4 and 5.

Each non-contact region 72 of the bottom retainer 70 may serve as a passage through which the electrolyte collected in the bottom interior of the case 15 may flow. Therefore, the electrode assembly 10 may smoothly absorb the electrolyte, and the performance of the secondary battery may be prevented from being degraded.

Figure 4:
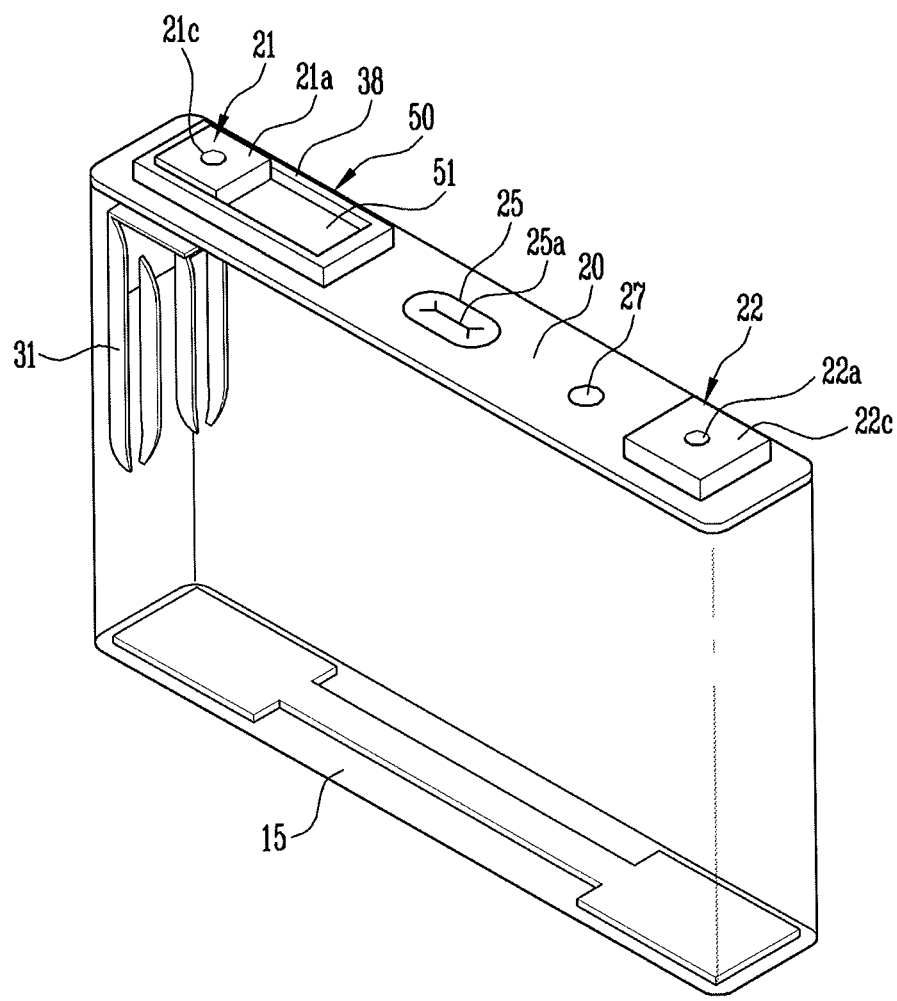
FIG. 4 illustrates a perspective view of the bottom retainer positioned in a case of FIG. 1.
Figure 5:
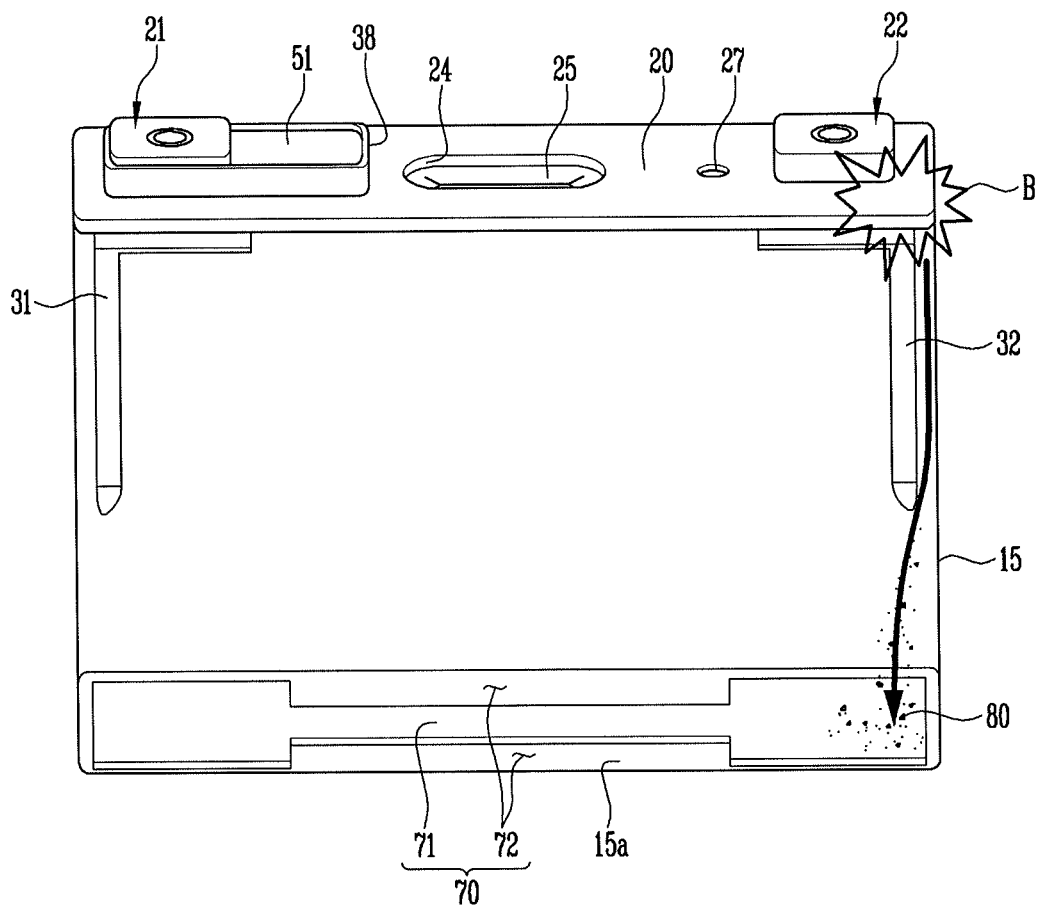
FIG. 5 illustrates a perspective view of a position where arc debris is produced in the event of an external short-circuit and a position of the bottom retainer.

FIG. 4 illustrates a perspective view of the bottom retainer positioned in the case in FIG. 1, and FIG. 5 illustrates a perspective view of a position where the arc debris is produced in the event of an external short-circuit and a position of the bottom retainer. Referring to FIGS. 4 and 5, since the secondary battery is repeatedly charged and discharged, an excessive amount of heat may be generated in the case 15 or the electrolyte may be decomposed. Due to the generation of the heat or the decomposition of the electrolyte, the internal pressure of the secondary battery may rise. An increase in internal pressure may lead to the ignition or bursting of the secondary battery.

To prevent the secondary battery from igniting or bursting due to an increase in internal pressure, the case 15 may be provided with the external short-circuit portion 50 (see FIG. 2). When the internal pressure of the secondary battery increases, the external short-circuit portion 50 may cause a short circuit between the cathode and the anode of the electrode assembly 10 (see FIG. 2) outside the secondary battery. If the external short-circuit portion 50 is operated, a high current may be discharged, and the degree of charge of the electrode assembly 10 may be decreased. A high current may be discharged, and a weak point on the discharge line connecting the electrode assembly 10 with the electrode terminal 21, 22 may be melted and cut.

In order to effectively cut the discharge line in the event of an external short-circuit or the overcharge, the secondary battery may have the fuse portion 60 on the lead tab 31, 32 connecting the electrode terminal 21, 22 with the electrode assembly 10. When the fuse portion 60 is melted and cut and then an interval between cut portions is narrow, arc B may be produced on the cut portions. The arc B produced in the secondary battery may react with the electrolyte, ignition or bursting may be caused, and safety of the secondary battery may be reduced.

Although the fuse portion 60 may be provided around the cathode terminal 21 or the anode terminal 22, the fuse portion 60 (see FIG. 2) may be provided around the anode terminal 22 in an embodiment. For example, the fuse portion 60 may be provided on the anode lead tab 32, and the fuse portion 60 may be melted and cut as a high-voltage current is discharged by the operation of the external short-circuit portion 50.

The fuse portion 60 may require a hole (not shown) at a predetermined position of the anode lead tab 32, and may have a smaller sectional, e.g., cross-sectional, area than the anode lead tab 32, which may not have a hole. The fuse portion 60 may be melted by heat that may be generated when a short circuit occurs in the electrode assembly 10 and then a high current may flow into the anode lead tab 32, and the flow of current between each of the case 15 and the cap plate 20 and the electrode assembly 10 may be interrupted.

The bottom retainer 70 disposed on the bottom interior of the case 15 according to an embodiment may be formed on points where the case 15 may be melted by the arc debris 80 when the arc B is produced, and it may be possible to prevent the bottom interior of the case 15 from being damaged by the arc debris 80 in the event of an external short-circuit. For example, a position of the bottom retainer 70 on the bottom interior of the case 15 may correspond to, e.g., underlie, the fuse portion 60.

For example, the bottom retainer 70 may include a plate-shaped body portion 71 that may be in contact with the bottom interior of the case 15, and a non-contact region 72 that may be provided at a position of the body portion 71 in the longitudinal direction thereof and is not in contact with the bottom interior of the case 15. The non-contact region 72 of the bottom retainer 70 may include grooves that are formed by eliminating, e.g., removing, the opposite sides of the middle region of the body portion 71 in the longitudinal direction thereof.

Both ends of the body portion 71 of the bottom retainer 70 may come into contact with the bottom interior of the case 15, and may support the electrode assembly 10 positioned in the case 15. Each of the non-contact regions 72 formed by eliminating e.g., removing, the opposite sides of the middle region of the body portion 71 in the longitudinal direction thereof may serve as a passage to permit flow of the electrolyte.

For example, since the bottom retainer 70 does not completely come into contact with the bottom interior of the case 15, electrolyte may be collected therebetween. The bottom retainer 70 may be provided with the non-contact regions 72, and the electrolyte may be prevented from being collected, e.g., trapped, in the bottom interior of the case 15. The bottom retainer 70 may be formed as an insulation member, and may be insulated from the electrode assembly.

Figure 6:
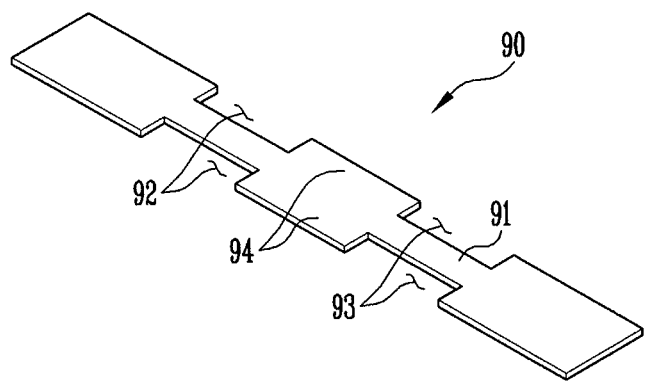
FIG. 6 illustrates a perspective view of a bottom retainer according to an embodiment.

FIG. 6 illustrates a perspective view of a bottom retainer according to an embodiment. Referring to FIG. 6, the bottom retainer 90 according to an embodiment may include non-contact regions 92 and 93 which are not in contact with the bottom interior of the case 15, similar to the preceding embodiment.

For example, the bottom retainer 90 may include a plate-shaped body portion 91 and the non-contact regions 92 and 93 which may be formed at predetermined positions of the body portion 91 in a longitudinal direction thereof. For example, the non-contact regions 92 and 93 of the bottom retainer 90 may be first and second grooves that are formed by eliminating, e.g., removing, opposite sides of the middle region of the body portion 91 in the longitudinal direction thereof, the first and second grooves being spaced apart from each other by a predetermined distance.

The eliminated, e.g., removed, regions of the bottom retainer 90, namely, four non-contact regions 92 and 93 may allow the electrolyte to flow smoothly. A support portion 94 provided between the non-contact regions 92 and 93 may reinforce the rigidity of the bottom retainer 90. Such a configuration may help to support the electrode assembly 10.

The non-contact regions 92 and 93 of the bottom retainer 90 according to an embodiment may prevent the electrolyte from being collected, e.g., trapped, in the bottom interior of the case 15, the electrode assembly 10 may be allowed to more easily absorb the electrolyte, and performance of the secondary battery may be prevented from being degraded.

By way of summation and review, a high-output secondary battery may exhibit high-energy density using a non-aqueous electrolyte. The high-output secondary battery may be made by connecting a plurality of secondary batteries in series, and may be used in driving a motor of a device requiring high power, for example, an electric vehicle.

The secondary battery may include an electrode assembly, a case, a cap plate, and an electrode terminal. The electrode assembly may have a separator, and an anode and a cathode provided on opposite sides of the separator. A case may accommodate the electrode assembly therein. A cap plate may close an opening of the case. An electrode terminal may be installed to pass through the cap plate, and may be electrically connected to the electrode assembly.

When the discharging or overcharging of a high current occurs in the secondary battery, an electrically weak portion on a line connecting the electrode assembly with the electrode terminal may be melted and cut. In order to effectively cut the line, the secondary battery may have a fuse portion therein.

Provided is a secondary battery, in which a predetermined portion of a bottom retainer disposed on a bottom of a case may be removed, and an electrolyte may be prevented from being collected, e.g., trapped, between the bottom interior of the case and the bottom retainer.

Also provided is a secondary battery, in which a bottom retainer may be formed on a bottom of a case to which arc debris coming from a fuse portion in the event of an external short-circuit may drop, and the case may be prevented from being melted.

According to embodiments, it may be possible to prevent the electrolyte from being collected, e.g., trapped, between the bottom interior of the case and the bottom retainer, the electrode assembly may be allowed to smoothly absorb the electrolyte, and performance of the secondary battery may be prevented from being degraded.

The bottom retainer may be provided on the bottom interior of the case corresponding to the position where the arc debris is dropped, the case may be prevented from being melted, and damage to the bottom interior of the case may be suppressed.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly including a first electrode, a second electrode, and a separator between the first electrode and the second electrode;
   a first lead tab electrically connected to the first electrode at one outer side of the electrode assembly;
   a second lead tab electrically connected to the second electrode at another outer side of the electrode assembly;
   a case accommodating the electrode assembly, the first lead tab, and the second lead tab therein, with an opening in a top of the case;
   a cap plate closing the opening of the case; and
   a bottom retainer on a bottom interior surface of the case, the bottom interior surface facing the top of the case, wherein:
   the bottom retainer includes a cut-out region at lateral edges thereof,
   the bottom retainer continuously extends in a lengthwise direction thereof between the bottom interior surface of the case and the electrode assembly,
   the cut-out region defines at least one narrow region between a pair of wide regions, each wide region of the pair of wide regions being wider than the narrow region, each wide region of the pair of wide regions having a plate shape such that a top surface thereof is flat and is parallel with a flat bottom surface thereof, the top surfaces of the pair of wide regions are coplanar with a top surface of the at least one narrow region, the top surfaces of the pair of wide regions and the at least one narrow region being parallel with the bottom interior surface of the case, bottom surfaces of the pair of wide regions are coplanar with a bottom surface of the at least one narrow region, a length of the bottom retainer from an outer end of one flat wide region of the pair of wide regions to an outer end of another flat wide region of the pair of wide regions is greater than a distance from the one outer side of the electrode assembly to the other outer side of the electrode assembly such that the flat top surfaces of the pair of wide regions face open spaces between outer sides of the electrode assembly and inner side surfaces of the case, and the cut-out region of the bottom retainer includes a first pair of grooves spaced apart from each other in the longitudinal direction and a second pair of grooves spaced apart from each other in the longitudinal direction, the first pair of grooves being on an opposite side of a support portion of the body portion in the lengthwise direction of the bottom retainer relative to the second pair of grooves, the support portion having the same width as the pair of wide regions.

2. The secondary battery as claimed in claim 1, wherein the first electrode includes a cathode, and the second electrode includes an anode.

3. The secondary battery as claimed in claim 2, wherein:
the first lead tab or the second lead tab includes a fuse portion, and
a position of the bottom retainer on the bottom interior of the case corresponds to the fuse portion.

4. The secondary battery as claimed in claim 3, wherein the fuse portion is around the anode.

5. The secondary battery as claimed in claim 1, wherein the bottom retainer includes an insulation member.

6. The secondary battery as claimed in claim 1, further comprising electrolyte between the bottom retainer and the bottom interior of the case.

7. A secondary battery, comprising:
an electrode assembly including a first electrode, a second electrode, and a separator between the first electrode and the second electrode;
a first lead tab electrically connected to the first electrode at one outer side of the electrode assembly;
a second lead tab electrically connected to the second electrode at another outer side of the electrode assembly;
a case accommodating the electrode assembly, the first lead tab, and the second lead tab therein, with an opening in a top of the case;
a cap plate closing the opening of the case; and
a bottom retainer on and not completely covering a bottom interior surface of the case by continuously extending in a lengthwise direction thereof between the bottom interior surface of the case and the electrode assembly and exposing outer edges of the bottom interior surface of the case, the bottom interior surface facing the top of the case,
wherein the bottom retainer has a plate shape such that a top surface thereof is flat and is parallel with a flat bottom surface thereof,
wherein a length of the bottom retainer from one outer end thereof to another outer end thereof is greater than a distance from the one outer side of the electrode assembly to the other outer side of the electrode assembly such that the flat top surface of the bottom retainer faces open spaces between outer sides of the electrode assembly and inner side surfaces of the case, and
wherein the cut-out region of the bottom retainer includes a first pair of grooves spaced apart from each other in the longitudinal direction and a second pair of grooves spaced apart from each other in the longitudinal direction, the first pair of grooves being on an opposite side of a support portion of the body portion in the lengthwise direction of the bottom retainer relative to the second pair of grooves, the support portion having the same width as the pair of wide regions.

* * * * *